METHOD OF AND APPARATUS FOR PRODUCING COMMUNICATION CABLES

Filed June 11, 1959 7 Sheets-Sheet 1

Inventor:
Georg Demmel,
By [signature] Atty.

July 4, 1961 G. DEMMEL 2,990,672

METHOD OF AND APPARATUS FOR PRODUCING COMMUNICATION CABLES

Filed June 11, 1959 7 Sheets-Sheet 2

Inventor:
Georg Demmel
By [signature] Atty.

July 4, 1961 G. DEMMEL 2,990,672

METHOD OF AND APPARATUS FOR PRODUCING COMMUNICATION CABLES

Filed June 11, 1959 7 Sheets-Sheet 3

Inventor:
Georg Demmel.
By [signature] Atty

Inventor:
Georg Demmel
By [signature] Atty.

July 4, 1961 G. DEMMEL 2,990,672

METHOD OF AND APPARATUS FOR PRODUCING COMMUNICATION CABLES

Filed June 11, 1959 7 Sheets-Sheet 5

Inventor.
Georg Demmel.
By [signature] Atty

July 4, 1961 G. DEMMEL 2,990,672
METHOD OF AND APPARATUS FOR PRODUCING COMMUNICATION CABLES
Filed June 11, 1959 7 Sheets-Sheet 6

Inventor:
Georg Demmel.
By [signature] Atty.

Inventor:
Georg Demmel.
By. [signature] Atty.

2,990,672

METHOD OF AND APPARATUS FOR PRODUCING COMMUNICATION CABLES

Georg Demmel, Berlin-Siemensstadt, Germany, assignor to Siemens and Halske Aktiengesellschaft Berlin and Munich, a corporation of Germany Filed June 11, 1959, Ser. No. 819,723
Claims priority, application Germany Aug. 15, 1958
16 Claims. (Cl. 57—34)

This invention is concerned with a method of and apparatus for producing communication cables of the type disclosed in copending application Serial No. 818,083, filed June 4, 1959, owned by the assignee named in the present case, comprising, disposed in helically stranded layers, individual conductors which are mutually crossed to form pairs of two-conductor lines.

According to the invention described in the above noted copending application, conductors which do not belong to respective pairs of two-conductor lines are also mutually crossed at predetermined short spacing, within fabricated lengths or sections of a cable, the spacing at which such conductors are crossed lying preferably within the order of magnitude of the length of the customary stranding twists. Two neighboring conductors are always advantageously mutually crossed at the crossing points. Predetermined short crossing sections are suitably formed and all even numbered and all odd numbered conductors of each layer, in a given count sequence, are within these crossing sections mutually crossed at short spacing. These crossings require careful consideration as to how they may be carried out in a technically and economically favorable manner.

The present invention proposes, for the production of a communication cable according to the copending application, to guide the conductors belonging to a layer, shortly before reaching a laying point, by means of a common guiding device, the operation of which is automatically controlled by means of switching elements, according to a predetermined crossing scheme or plan. The switching elements are suitably situated under control of the crossing scheme or plan, by means of stepping devices, relays or the like. The crossing scheme is advantageously provided in the form of a punched tape or the like, which is advanced through a switching device with a speed corresponding to the feed speed of the conductors or a speed related thereto, the switching device in turn controlling the operations of the conductor guiding device depending upon the pattern of the punched tape employed.

The various objects and features of the invention will appear from the description which will be rendered below with reference to the accompanying drawings. In the drawings, FIGS. 1, 2 and 3 show an embodiment of a conductor guiding device, FIG. 1 showing a sectional view perpendicular to the laying or stranding axis, taken along line A—A in FIG. 2; FIG. 2 showing a longitudinal section taken along line B—B in FIG. 1; and FIG. 3 showing a section perpendicular to the laying or stranding axis, taken along line C—C in FIG. 2;

Figure 1:
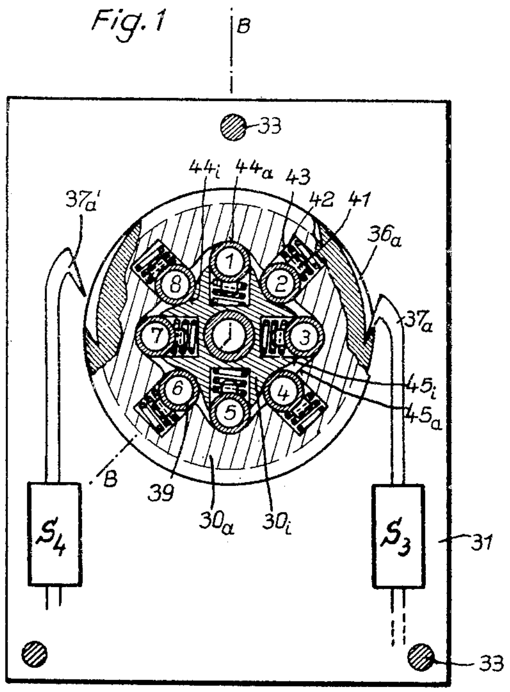
Figure 3:
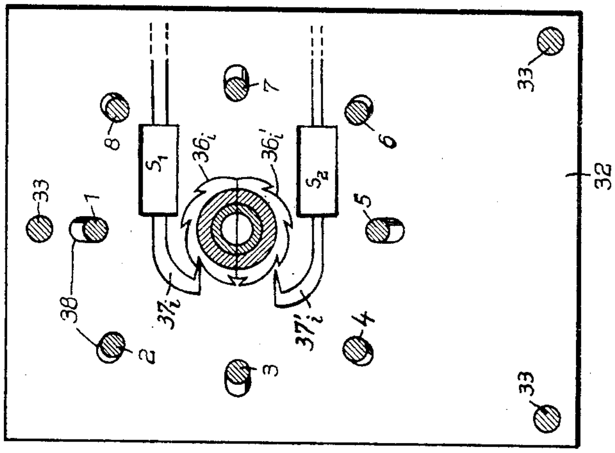
Figure 2:
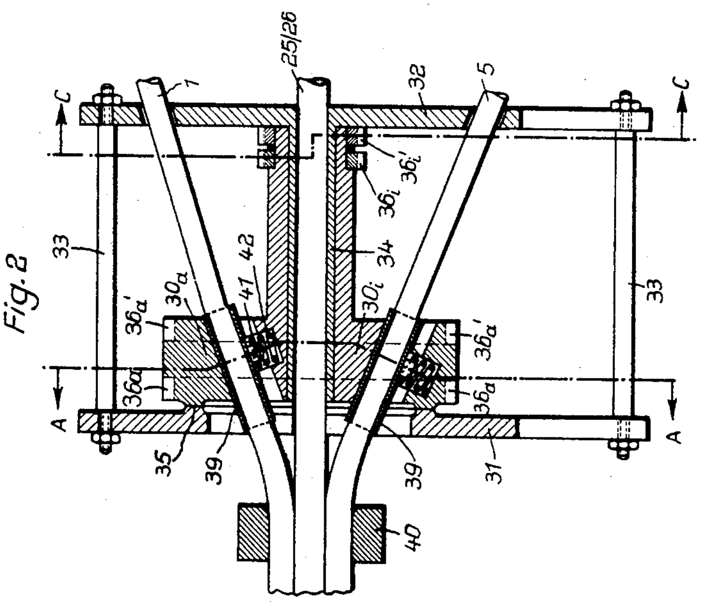

The conductor guiding device according to FIGS. 1, 2, 3 is adapted to simultaneously guide at crossing points even numbered conductors in one peripheral direction, passing odd numbered conductors which are guided in the other peripheral direction, at an angle, with a spacing corresponding to the mutual angular spacing between two neighboring conductors. It is assumed that eight conductors of a layer with the count sequence 1–8, are to be mutually crossed in a manner such as shown in FIG. 2 of the copending application.

The conductor guiding device according to FIGS. 1, 2, 3 comprises two coaxially disposed guiding plates **30*i* and 30*a*, which are rotatable in opposite directions depending upon the crossing scheme, between which the conductors 1–8 of the corresponding layer are passed so that they may be rotated in the peripheral direction together with their guide tubes 39. In order to cross at the crossing points always two neighboring conductors, the odd numbered conductors are allocated to one, for example, to the inner crossing member 30*i*, while the even numbered conductors are allocated to the other, for example, to the outer crossing member. The guiding device is structurally disposed in a frame comprising two plates 31 and 32, disposed perpendicularly to the conductor laying or stranding axis, and connected together by means of rods 33. The inner guiding plate 30*i* is journalled upon a hollow shaft 34 while the outer guiding plate 30*a* is supported upon the inner plate and resting against the slide or journal surface carried by the frame plate 31. The inner guiding plate is provided with teeth 36*i* and 36*i*′ for cooperative engagement by pawls 37*i* and 37*i*′ shown in FIG. 3 and can accordingly be rotated in one or the other direction of rotation. The outer guiding plate is provided with teeth 36*a* and 36*a*′ cooperating with pawls 37*a* and 37*a*′ for rotating it likewise in one or the other direction of rotation. The pawls are actuated by means of stepping devices or the like, stepping devices S1 and S2 being provided for actuating the pawls 37*i* and 37*i*′ for the inner guiding plate, and stepping devices S3 and S4 are provided for actuating the pawls 37*a* and 37*a*′** for the outer guiding plate. These stepping devices may for example be solenoids, the pawls extending from the plungers thereof which are arranged for direct or indirect immersion into the corresponding magnets. In the assumed case of a layer of eight conductors, the inner guiding plate will have an approximately square outer profile with a similar inner profile for the outer guiding plate.

As will be seen from FIGS. 2 and 3, the conductors 1–8 are guided to the laying nipple 40 (FIG. 2) through openings 38 in the frame plate 32 (FIG. 3) and through the groups of guide tubes 39 disposed between the two guiding plates. A central forming strand 25 carrying another forming strand 26 wound thereon and forming therewith a hollow core is at the same time moved to the laying nipple 40 through the hollow shaft 34. The guide tubes 39 engage, by means of short stubs 41, helical springs 42 which are disposed within recesses 43 formed respectively in the inner and outer guiding plates. The guide tubes 39 are on the other side thereof journalled in recesses **44*i* and 44*a* of the inner slide track 45*i* (outer profile of the inner guiding plate) and the outer slide track 45*a*** (inner profile of the outer guiding plate).

The parts are accordingly so arranged that the guide tubes 39, seen in peripheral direction, are by means of their respective springs pressed against the slide tracks of the inner and the outer guiding plate, respectively.

At a crossing point, the inner guiding plate **30*i* is by means of the pawl 37*i* rotated, for example, in right hand sense and the outer guiding plate 30*a* is by means of pawl 37*a*′ rotated in left hand sense, by an angle corresponding to the mutual angular distance between two neighboring conductors. Each two neighboring guide tubes are by such rotation moved, one passing the other, thus resulting in mutual crossing of the respective neighboring conductors. After moving through one half crossing section, the inner crossing member 30***i* is by means of pawl 37*i'* rotated oppositely, in left hand sense and the outer crossing member 30*a* is by means of pawl 37*a* rotated in right hand sense.

Figure 4:
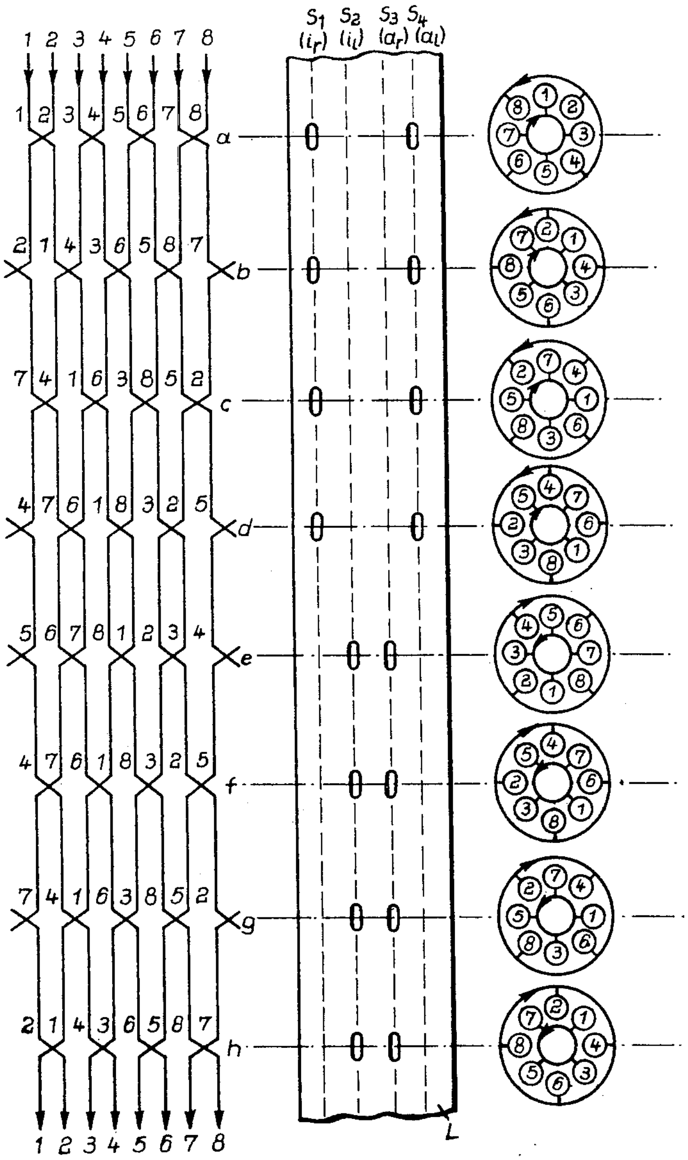
FIG. 4 is intended to aid in the explanations relating to the conductor crossing scheme.

FIG. 4 serves for explaining the rotation motion of the guiding plates within a crossing section, showing in the left part thereof the crossing plan or scheme of a crossing section *s*, in the central part the punched tape L for controlling the actuation of the pawls, and in the right part the position of the conductors at the corresponding crossing points. In accordance with the crossing scheme shown in the left portion of FIG. 4, conforming to the crossing scheme of FIG. 2 of the copending application, the eight conductors 1–8 are mutually crossed at the crossing points *a*–*h*, that is, the respective neighboring conductors are at the crossing points crossed in such a manner that the odd numbered conductors are with respect to the even numbered conductors at each crossing point displaced or shifted by a peripheral angle of 45°. After a shifting of the conductors by 180°, that is, at the crossing point *e*, the conductors are shifted or displaced in opposite direction, resulting at the end of the crossing section again in the identical conductor sequence.

The stepping device S1 moves the inner guiding plate 30*i* by means of the pawl 37*i* clockwise and the stepping device S2 moves it by means of the pawl 37*i'* counterclockwise; the stepping device S3 moves the outer guiding plate 30*a* by means of the pawl 37*a* clockwise and the stepping device S4 moves it by means of the pawl 37*a'* counterclockwise. This operation results in consideration of the assumed crossing plan in the punched tape L shown in the central portion of FIG. 4, such punched tape controlling the actuation of the stepping devices. The bracketed expressions shown respectively below the ferences S1, S2, S3, S4 (top of central part of FIG. 4) mean the following: $i_r$=inner right, $i_l$=inner left, $a_r$=outer right and $a_l$=outer left, thereby indicating the direction of rotation of the guiding plates upon actuation thereof by the stepping devices.

The respective conductor positions at the crossing points and the corresponding rotation of the inner and outer guiding plates are apparent from the figures along the right hand part of FIG. 4. For example, at the crossing point *a* there is prior to the beginning of the crossings the conductor sequence 1, 2, 3, 4, 5, 6, 7, 8, and by means of the stepping device S1, the inner guiding plate is at this point rotated clockwise while the outer guiding plate is by means of the stepping device S4 rotated counterclockwise, resulting in the conductor sequence 2, 1, 4, 3, 6, 5, 8, 7. At the crossing point *e*, the stepping devices S2 and S3 will cause counterclockwise rotation of the inner guiding plate and clockwise rotation of the outer guiding plate.

Figure 5:
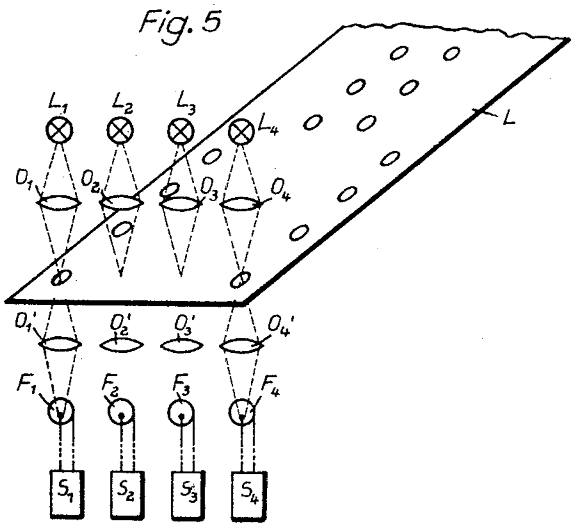
FIG. 5 illustrates an example of a punched tape which is scanned light-electrically for the control of the stepping devices.

The stepping devices and therewith the pawls may be actuated by the use of the punched tape by the scanning thereof by means of photocells, as illustrated in FIG. 5, showing part of the punched tape L of FIG. 4 in perspective representation. L1, L2, L3, L4 are light sources respectively projecting light rays to the optical lenses O1, O2, O3, O4 which in turn project the light rays through the punched holes in the tape. Underneath the punched tape L are disposed the potical lenses O1', O2', O3', O4', and the photocells F1, F2, F3, F4. The photocells F1–F4 receive light from the light sources only through the holes in the punched tape. The electric currents produced by the photocells are conducted to the stepping devices S1 and S2 or S3 and S4, by way of suitable amplifiers (not shown) and the stepping devices are thereby in known and well understood manner actuated.

Figure 6:
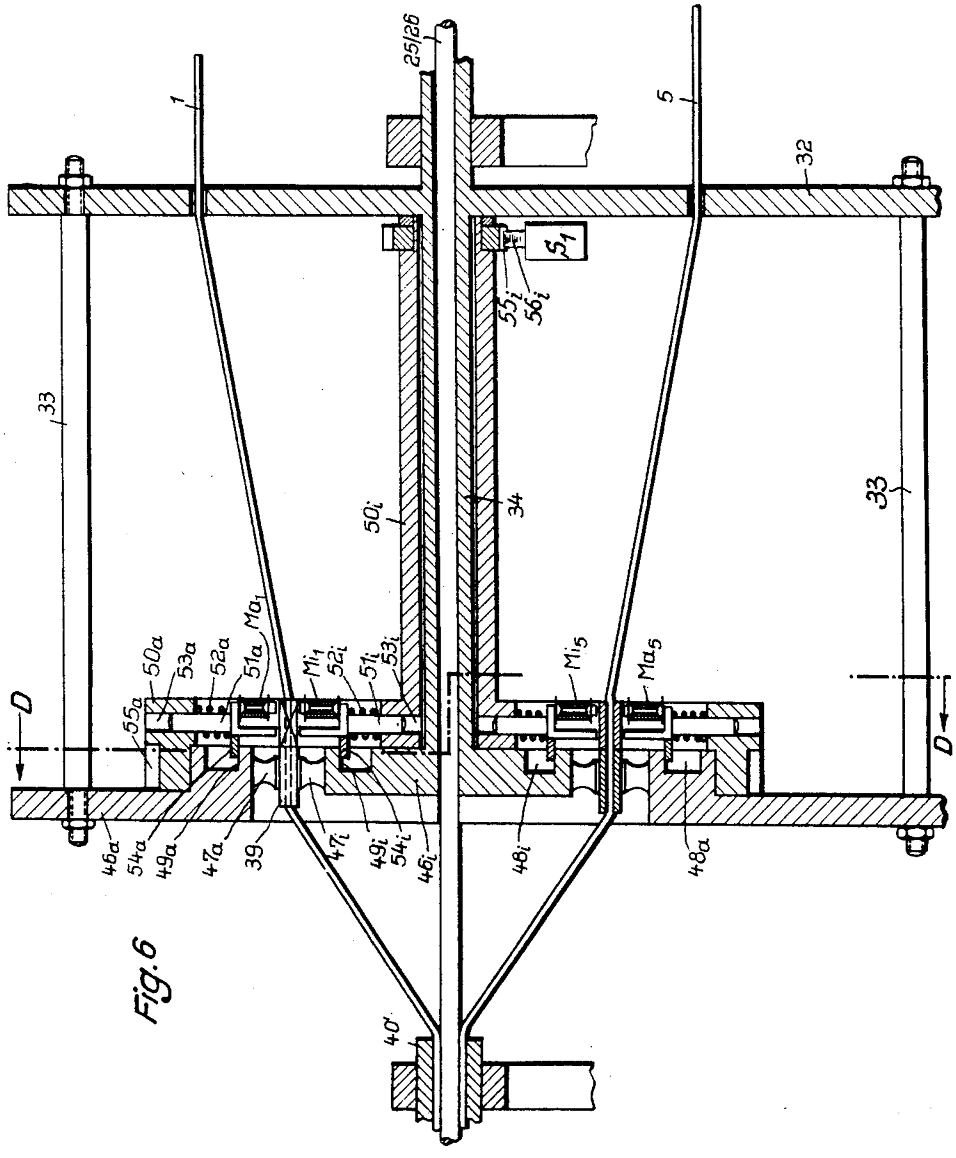
FIGS. 6 and 7 show in sectional views a further embodiment of a conductor guiding device.
Figure 7:
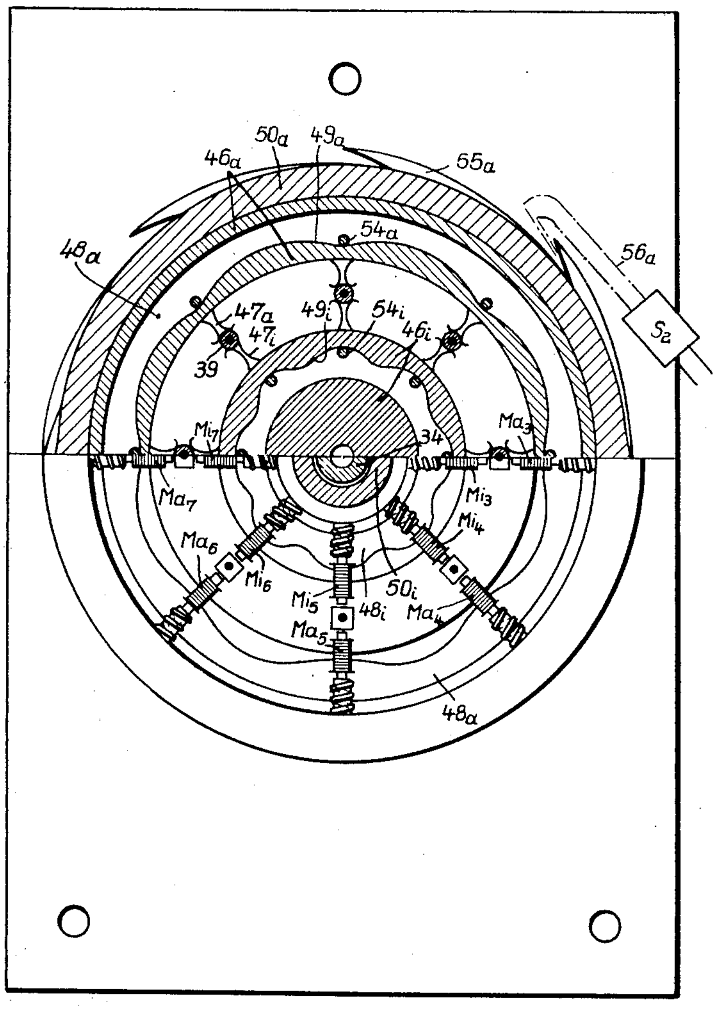

FIGS. 6 and 7 show in cross sectional representation a further embodiment of a conductor guiding and crossing device, FIG. 7 showing a section taken along line D—D of FIG. 6. This device is adapted to effect all systematic crossings belonging to a crossing section *s* and to a position-change section *k*. Each two neighboring conductors and each two neighboring guide tubes disposed between the guide elements are individually exchangeable.

In FIGS. 6 and 7, there is provided an end wall (taking the place of the end plate 31 used in FIGS. 1–3) which comprises the inner end plate 46*i* and the outer end plate 46*a*. The guide tubes 39 are resiliently disposed between spring brackets 47*i* and 47*a* which are secured to the plates 46*i* and 46*a*. The inner plate 46*i* and the outer plate 46*a* are provided with groove-like recesses 48*i* and 48*a*, the inner recess extending on the outside thereof in undulating manner in a guide track 49*i* and the outer recess extending on the inside thereof in undulating manner in a guide track 49*a*. At the outer rim of the inner guiding plate 50*i* there are provided magnets M*i*1 to M*i*8 which are by means of stubs 51*i* and springs 52*i* resiliently journalled in bores 53*i*. The magnets M*a*1 to M*a*8 are also journalled to the inner rim of the outer guiding plate 50*a* in bores 53*a* by means of stubs 51*a* and springs 52*a*. The guide pins 54*i* and 54*a* which are connected with the magnets are slidably journalled upon the guide tracks 49*i* and 49*a*. The inner guiding plate 50*i* is rotated by the teeth 55*i* and the pawl 56*i*. The outer guiding plate 50*a* is provided with teeth 55*a* for rotation thereof through the medium of pawl 56*a*.

In the normal or resting position, the guide tubes 39 are held between the spring brackets 47*i* and 47*a* by the magnets M*i* and M*a*. The magnets partake in the rotation of the guiding plate 50*i* and 50*a*. The crossing of each of two neighboring conductors, for example, conductors 1 and 2, is effected by deenergizing one of the two magnets belonging to each such conductor, thus leaving either the magnets M*a*1 and M*i*2 or M*i*1 and M*a*2 energized. In case only the two conductors 1 and 2 are to be crossed while the other conductors are to be retained in their respective positions, all other magnets M*a*3 and M*i*3, M*a*4 and M*i*4, etc., are caused to deenergize and the stepping devices S1 and S2 are thereupon actuated. The guide tube 39 of one of the conductors, for example, conductor 1 is thereby taken along by means of magnet M*a*1 and the outer guiding plate 50*a* while the guide tube 39 of the other conductor, for example, conductor 2, is taken along by means of the magnet M*i*2 and the inner guiding plate. The guide pins 54*i* and 54*a*, gliding respectively along the guide tracks 49*i* and 49*a*, effect during the rotation of the two guiding plates the passing of one guide tube relative to the other guide tube. More than two and even all respectively neighboring conductor pairs can be crossed incident to one rotation of the inner and outer guiding plates. All magnets are after each crossing again energized and the guide tubes are thus again held fixedly within their respective spring members 47*i* and 47*a*. The actuation of the stepping devices S1 and S2 and therewith the energization of the magnets M*i* and M*a* may be effected in the same or in similar manner as explained in connection with FIGS. 1–5. The conductors 1–8 move into the laying nipple in the sequence respectively determined by the crossing scheme.

Figure 8:
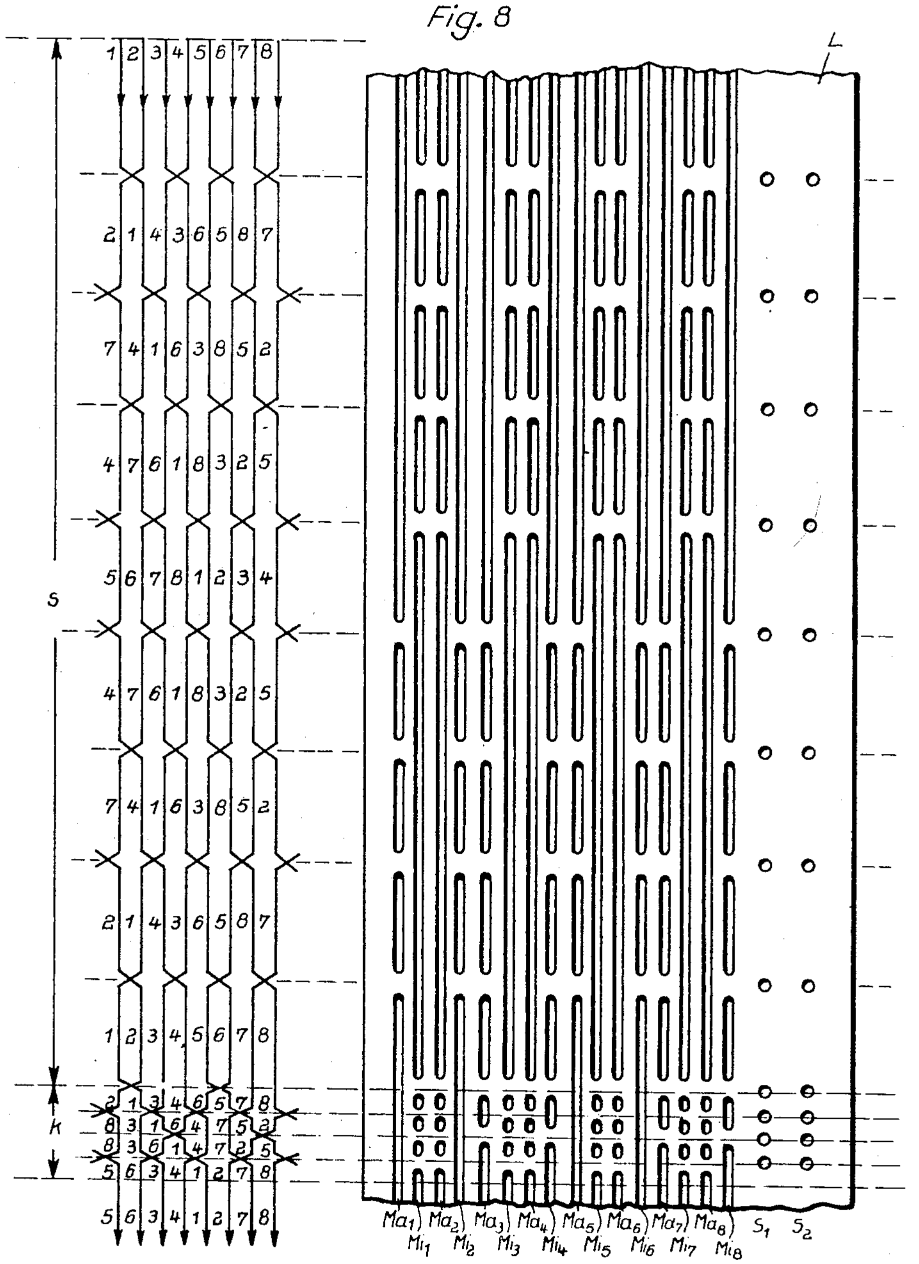
FIG. 8 shows an example of a crossing plan.

FIG. 8 shows an example of a crossing scheme or plan for a crossing section *s* and a position-change section *k* as well as a punched tape L for carrying out desired crossings. As will be seen, the diagonally oppositely disposed conductors 1 and 5 and also 2 and 6 change places in the position change section *k*, resulting in a conductor sequence 1, 2, 3, 4, 5, 6, 7, 8 at the beginning of the position change section and 5, 6, 3, 4, 1, 2, 7, 8 at the end thereof. This position exchange is effected by repeated crossing of each of two respectively neighboring conductors. The punched tape L has a total of eighteen tracks, namely, eight tracks for the control of the magnets M*a*1 to M*a*8, eight tracks for the control of magnets Mi1 to Mi8 and two tracks for the control of the stepping devices S1 and S2. The respective magnets are energized within the perforated portions of the tracks and deenergized in the corresponding intermediate portions thereof.

For the production of communication cables or bundles having a plurality of conductor layers, in one operation, the crossings of the conductors in the inner layer can suitably be effected by means of a guiding and crossing device according to FIGS. 1–3 and the crossings of the conductors in the outer layer can be effected by means of a guiding and crossing device according to FIGS. 6 and 7. It is understood, of course, that the conductor guiding and crossing devices, so far as the numbers of conductors are concerned, must conform to the desired bundle structure, and that the numbers of conductors may accordingly differ from those shown in the figures. For example, the guiding and crossing device for the inner layer may provide for eight conductors and the guiding and crossing device for the outer layer may provide for sixteen conductors. In a suitable machine, the guiding and crossing devices may be disposed fixedly and the finished crossed layers may be caused to move into a drawing-off device which is rotatable about the laying axis; the cross cable or bundle is wound on a drum positioned at a fixed place. Such apparatus makes it possible to draw the conductors to be fed into the guiding and crossing devices freely from suitable supply containers.

Figure 9:
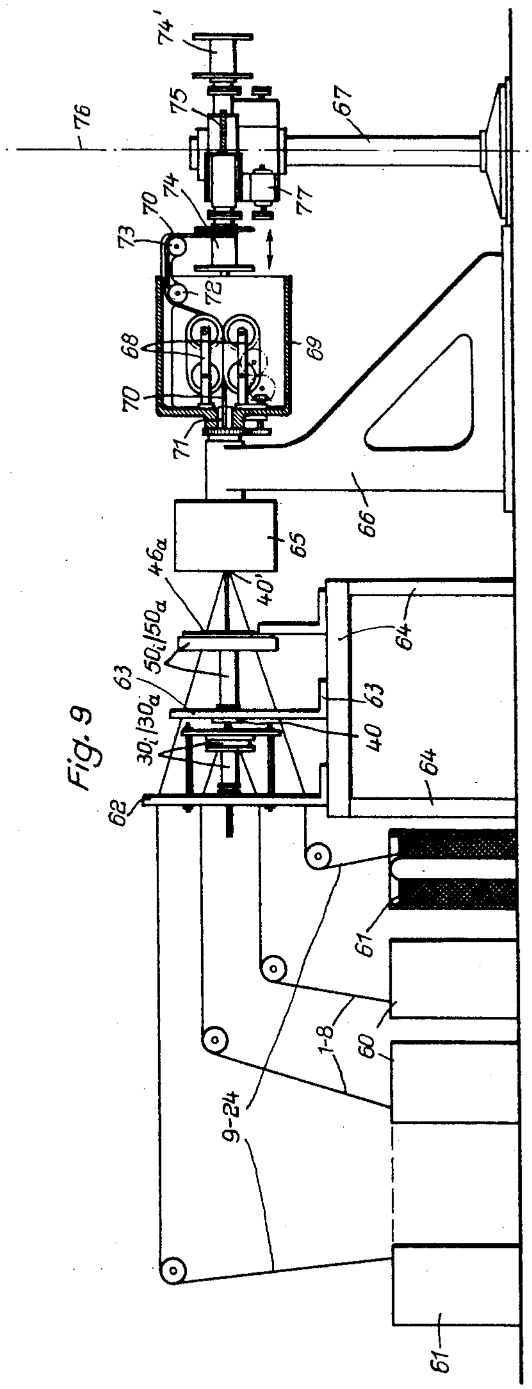
FIG. 9 illustrates apparatus for the production of a two-layer conductor bundle in one and the same operation.

FIG. 9 shows apparatus for producing a two-layer bundle in one continuous operation. The conductors 1–8 for the inner layer are stored in barrels 60 and the conductors 9–24 for the outer layer are stored in barrels 61, from which the respective conductors may be freely drawn. All conductors run initially through a distributor plate 62. The conductors 1–8 for the inner layer are guided through the guiding and crossing device **30*i*/30*a* which is constructed according to FIGS. 1–3, and the conductors 9–24 for the outer layer are guided through the guiding and crossing device 50*i*/50*a* which is constructed according to FIGS. 6 and 7. The crossing schemes according to which the conductors of the two layers are to be crossed, are suitably provided upon a common punched tape. The conductors of the inner layer run to the point 40 and those of the outer layer to the point 40′. The distributor plate 62 as well as the distributor plate 63 and the end plate 46*a* of the guiding and crossing device for the outer layer are fixedly mounted on a frame 64. The crossed and layer-wise combined conductors run through the device 65 in which the bundle is provided with identifying bands, threads and the like. The draw-off device, shown on a smaller scale, preferably comprises draw-off conveyors 68 which are journalled in the rotatable frame 69. The completed bundle 70 moves through the hollow shaft 71 and through the draw-off 68 and thereupon over deflection rollers 72, 73 onto the drum 74 the axis of which coincides with the laying axis. The orderly winding of the bundle on the drum 74 is effected by moving the drum 74 axially back and forth by means of the spindle 75. When the drum 74 is fully packed, an empty drum 74′ is brought into receiving or winding position by rotating the entire winding device about the axis 76. The drum which happens to be in receiving or winding position, is driven by means of a friction drive 77**.

The apparatus permits production of multi-layer bundles with great fabrication speed. The longitudinal spacing between the individual crossings is adjustable by alternation of the speed at which the punched tape is moved through the switching device relative to the draw-off speed. The fabricated length is adjustable in customary manner. The apparatus is sensibly adapted for producing bundles comprising one layer or more than two layers.

Modifications are possible. For example, other guide devices, for example, guide roller systems may be used in place of the guide tubes 39. Similarly constructed punched tapes which move through the switching device at a speed different relative to the drawing-off speed of the machine may be employed for the production of communication cables or bundles comprising a plurality of layers or for communication cables comprising a plurality of bundles. The punched tape containing the crossing scheme of a crossing section *s* and if desired a position change section *k* or a multiple thereof, is suitably made in the form of an endless band moving through the switching device over suitable guide rollers or the like. However, the punched tape may also contain the crossing scheme for an entire fabrication length or section of a cable. In the embodiments according to FIGS. 6 and 7, the magnets M*i* atnd M*a* may be actuated directly under control of a punched tape instead of by way of stepping devices. The guide tubes 39 may be held by means other than the spring brackets **47*i* and 47*a***, for example, by electromagnets.

Changes and modifications may accordingly be made within the scope and spirit of the appended claims which define what is believed to be new and desired to have protected by Letters Patent.

I claim:

1. A method of producing a communication cable having individual conductors helically stranded in layers, any two individual conductors adapted to form a pair representing a two-conductor line, all said conductors within a layer being systematically transposed to change their mutual positions at predetermined relatively closely spaced points within a fabricated cable length, the transpositions being effected at said predetermined points between any two conductors which are adjacent to one another, said method comprising passing the conductors belonging to a layer ahead of the laying point therefor through two groups of coaxially arranged guide members, rotating said guide members in opposite direction to transpose the respective adjacent conductors, and automatically controlling the rotation of said guide members in accordance with a predetermined crossing scheme.

2. A method according to claim 1, wherein, based upon a numerical count sequence of the conductors of the layer in peripheral direction at the start of stranding, odd numbered conductors are passed through one group of guide members while even numbered conductors are passed through the other group of guide members, and wherein said even numbered conductors are moved by their respective guide members at the crossing points in one peripheral direction while the odd numbered conductors are moved by their respective guide members in the opposite peripheral direction, said movements being executed at a predetermined angle corresponding to the angular spacing between the respective adjacent conductors.

3. A method according to claim 1, wherein the direction of motion of the conductors is reversed in predetermined spacing corresponding to the extent of a crossing section.

4. A method according to claim 1, wherein the crossing scheme is incorporated in a punched tape, the step of moving said tape at a speed related to the speed of motion at which said conductors pass through the respective crossing points for controlling the crossing of said conductors in accordance with the punched pattern of said tape.

5. A method according to claim 4, wherein similar punched tapes are used for producing crossing sections of different length, respectively for different cable layers and cable bundles, the step of moving said tapes at speeds which are different in relation to the draw-off speed.

6. In apparatus for producing a communication cable having individual conductors helically stranded in layers, any two individual conductors adapted to form a pair representing a two-conductor line, all of said conductors within a layer being systematically transposed to change their mutual positions at predetermined relatively closely spaced points within a fabricated cable length, the transpositions being effected at said predetermined points between any two conductors which are adjacent to one another, a crossing device comprising two coaxially arranged groups of conductor guide members, a rotatable guiding plate for each group, means for conducting to the respective guide members conductors to be transposed, means for rotating said guiding plates to cause said guide members to move the conductors guided thereby so as to transpose said conductors, and a device for automatically controlling the rotation of said guiding plates to effect the conductor-transposing motion of said guide members in accordance with a predetermined crossing scheme.

7. Apparatus according to claim 6, wherein tubular members constitute said conductor guide members, an inner rotatable guiding plate for one group of said tubular guide members and an outer rotatable guiding plate for the other group of said tubular guide members, spring means carried by the outer rotatable guiding plate for pressing the tubular guide members associated therewith against a gliding track formed by the inner rotatable guiding plate, spring means carried by the inner guiding plate for pressing the tubular guide members respectively associated therewith against a gliding track formed by the outer rotatable guiding plate, each tubular guide member carrying a pin axially extending for cooperation with a spring in the respective rotatable guiding plates.

8. Apparatus according to claim 7, comprising ratchet means for driving said coaxially disposed rotatable guiding plates, and pawl means cooperatively disposed with respect to said ratchet means for imparting rotation to the respective guiding plates.

9. Apparatus according to claim 8, wherein said ratchet means extends over half of the circumference of the respective guiding plates in one direction and over the other half in the other direction.

10. Apparatus according to claim 6, wherein tubular guide members constitute said conductor guide members, two coaxially disposed rotatable guiding plates for said tubular guide members, each of two neighboring tubular guide members being individually exchangeably disposed between said rotatable guiding plates, spring bracket means connected with said rotatable guiding plates, and pairs of magnets carried respectively by said guiding plates for holding said tubular guide members in assigned positions.

11. Apparatus according to claim 10, wherein said rotatable guiding plates have undulating tracks formed thereon for guiding said tubular guide members so that one passes the other during the rotation of said guiding plates, said tracks extending along annular grooves formed in said guiding plates, and means extending from said magnets into said grooves for sliding engagement with said tracks.

12. Apparatus for producing in one continuous operation a communication cable having at least two layers of conductors, comprising two structurally different serially related crossing devices for crossing the conductors of two layers, wherein the crossing device for the conductors of the inner layer consists of two coaxially arranged groups of guide members, each group of guide members being attached to a rotatable guiding plate, said guide members taking up the conductors including guide tubes for guiding the conductors, said guide tubes changing position between the groups of guiding plates to effect the transpositions of the conductors guided thereby, the crossing device for the conductors of the outer layer likewise consisting of two coaxially arranged groups of guide members including guide tubes for guiding and taking up the conductors, each of two neighboring guide tubes being individually exchangeably disposed between said rotatable guiding plates, spring bracket means connected with the rotatable guiding plate carrying said guide tubes, and a pair of magnets holding said guide tubes in assigned positions respectively carried by the inner and outer rotatable guiding plates.

13. Apparatus according to claim 6, wherein the crossing scheme is incorporated in a punched tape, means for moving said tape at a speed related to the speed of motion of said conductors to effect the crossing of said conductors in accordance with the punched pattern of said tape.

14. Apparatus according to claim 13, wherein said tape is an endless tape containing at least the crossing scheme of one crossing section.

15. Apparatus according to claim 13, wherein said tape contains the crossing scheme of an entire fabricated cable length.

16. Apparatus according to claim 13, comprising switching means for controlling the rotation of said guiding plates, photocell means for controlling the actuation of said switching means, and light sources the light from which is conducted to said photocell means through openings formed in said punched tape.

References Cited in the file of this patent

UNITED STATES PATENTS

| | | |
|---|---|---|
| 2,234,996 | Welch | Mar. 18, 1941 |
| 2,412,196 | Ashbaugh et al. | Dec. 10, 1946 |
| 2,869,316 | Lilly | Jan. 20, 1959 |